(12) United States Patent
Ceshkovsky

(10) Patent No.: US 7,061,853 B2
(45) Date of Patent: Jun. 13, 2006

(54) HIGH-DENSITY OPTICAL PICKUP FOR ROTATING MEDIA

(75) Inventor: Ludwig Ceshkovsky, Irvine, CA (US)

(73) Assignee: Discovision Associates, Irvine, CA (US)

( * ) Notice: Subject to any disclaimer, the term of this patent is extended or adjusted under 35 U.S.C. 154(b) by 703 days.

(21) Appl. No.: 09/683,359

(22) Filed: Dec. 18, 2001

(65) Prior Publication Data

US 2003/0112723 A1    Jun. 19, 2003

(51) Int. Cl.
G11B 7/00 (2006.01)

(52) U.S. Cl. ............... 369/124.12; 269/124.03; 269/44.41

(58) Field of Classification Search ............ 369/44.14, 369/44.32, 44.37, 59.2, 112.01
See application file for complete search history.

(56) References Cited

U.S. PATENT DOCUMENTS

| | | | |
|---|---|---|---|
| 5,132,957 A * | 7/1992 | Mashimo | 369/59.2 |
| 5,231,620 A * | 7/1993 | Ohuchida | 369/44.14 |
| 5,446,565 A | 8/1995 | Komma et al. | |
| 5,854,780 A | 12/1998 | Opheij et al. | |
| 5,883,873 A | 3/1999 | Morita | |
| 5,883,874 A | 3/1999 | Choi | |
| 5,886,970 A | 3/1999 | Tachibana et al. | |
| 5,889,749 A | 3/1999 | Katsuma et al. | |
| 5,892,744 A | 4/1999 | Ohba | |
| 5,901,131 A | 5/1999 | Ootaki et al. | |
| 5,905,707 A | 5/1999 | Ju et al. | |
| 5,905,708 A | 5/1999 | Richter | |
| 5,920,537 A | 7/1999 | Komma et al. | |
| 5,923,626 A | 7/1999 | Richter | |
| 6,480,445 B1 * | 11/2002 | Yun et al. | 369/44.32 |
| 6,563,780 B1 * | 5/2003 | Kim et al. | 369/112.01 |
| 6,798,731 B1 * | 9/2004 | Kim et al. | 369/124.14 |
| 6,914,858 B1 * | 7/2005 | Cho | 369/44.41 |
| 2001/0021150 A1 * | 9/2001 | Chung et al. | 369/53.19 |

OTHER PUBLICATIONS

John Watkinson, "The Art of Data Recording", p. 121, Published 1994, Butterworth-Heinemann Ltd. Linacre House, Jordon Hill, Oxford.

* cited by examiner

Primary Examiner—Thang V. Tran
(74) Attorney, Agent, or Firm—Steve A. Wong; Micah P. Goldsmith

(57) ABSTRACT

An optical pickup is described with an electronically adjustable beam spot size for reading optical media. Two proximal light sources are impinged on a selected track of the media and the reflected light is registered by photodetector arrays. The electrical signal generated from the leading detector is delayed, based on a distance between beams and the speed of the media, to achieve a desired amount of temporal coincidence with the electrical signal associated with the lagging beam. The electrical signals are combined, such as in a multiplier circuit, to create a third electrical signal whose response to a data bit can be adjusted to a shorter duration than the responses from either first or second beams. Therefore, the effective spot size may be electronically controlled, wherein light sources of longer wavelengths may be utilized, and optical data storage systems may be configured for reading media having different optical characteristics.

11 Claims, 3 Drawing Sheets

HIGH-DENSITY OPTICAL PICKUP FOR ROTATING MEDIA

BACKGROUND OF THE INVENTION

1. Field of the Invention

The present invention is generally related to an optical pickup for reading information contained on an optical data storage media, and more particularly to an optical pickup apparatus and method utilizing multiple read beams to reduce effective read beam spot size.

2. Description of the Background Art

Optical data storage provides an inexpensive and high bit density, non volatile data storage method. Optical media is typically configured as an information plane within a record carrier that is configured for rotation wherein a plurality of tracks at fixed radial distances from the center of rotation are described, or a single track is configured as a spiral in a similar manner as found on vinyl records in previous eras. Data is read from the media by directing a beam of light onto the media and detecting the reflection of the beam from the media with a detector. Optical features of the media are then discerned from the electrical signal generated by the detector as data bits encoded within the media are reflected as features within the waveform of the electrical signal. It will be appreciated that the duration of the waveform feature is proportional to the beam diameter used to scan the surface of the media, therefore, larger beam diameters result in extended waveform feature lengths. Although holographic and other forms of data encoding are available, data is typically encoded onto the surface, or reflective subsurface, of the media in the form of pits. The minimum size of each pit is largely determined by the diameter of the beam of light that impinges on the surface of the media for reading the data.

The density of optical data storage has continued to increase as the wavelengths of the laser light sources used shrinks. It will be appreciated that the spot diameter of a beam of light for reading pit information will be at or greater than the wavelength lambda ($\lambda$) of the light source. The spot diameter of the laser beam is proportional to the wavelength lambda ($\lambda$), and is inversely proportional to the numerical aperture (NA) of the objective lens. In most high density optical media information is read using a laser light source of a short wavelength approaching the pit diameter and an objective lens having a large numerical aperture (NA).

It will be appreciated that the cost of a laser source is highly dependent on the wavelength of the light generated, with shorter wavelengths being more costly than longer wavelengths of light. Increasing the storage density of the optical media, therefore, results in cost increases from the need for higher resolution head positioning and for shorter wavelength light sources. In addition, in select applications the beam size must be adjusted to accommodate media which has been encoded at different densities, such as for example, DVD optical disks and CD disks. Presently, optical drives that read multiple densities rely on mechanical means for matching the spot size to match the media, such as changing of the lens optics, wherein a shorter wavelength of light may be utilized to read either smaller or larger pit sizes. The current reliance on matching the optical properties of the beam with the size of the pits encoded within the media, increases the cost of optical data storage devices and limits the bit densities that are economically available.

Therefore, a need exists for a method and apparatus that provide for the reading of high density optical media without the need of more expensive short wavelength light sources as outlined above, and which can be adjusted for reading optical media having different densities. The present invention satisfies those needs, as well as others, and overcomes the deficiencies of previously developed optical pickups.

SUMMARY OF INVENTION

The optical pickup of the present invention reads the reflected light from a pair of optical beams directed proximal to one another along the same track. The means for sensing optical information along the track may comprise an optical detector, such as a small array of photodiodes, or the like. It will be appreciated that data being read from one of the beams, the leading beam, will be read prior to the same data being picked up by the other beam, the lagging beam. A particular data bit within the media will therefore show up as a feature in the waveform of the leading beam a given time before it shows up in the waveform of the lagging beam. The amount of delay between the leading and lagging beams is determined by the circumferential speed of the particular track, which is given by the angular velocity of the media in radians per second multiplied by the radius of the given track.

A selectable delay is introduced into the electrical signal from the leading detector such that any particular data bit read by the leading and lagging beams will at least partially coincide in the resultant electrical signals. The two signals are then combined, such as within a multiplier, to generate a third electrical signal. The coincidence in the waveform feature, resulting from reading the same data bit on the track, between the leading and lagging beams is therefore represented in a feature exhibited within the third electrical signal.

It will be appreciated that the size of the feature within the waveform of the third electrical signal is determined by the amount by which the given feature in the first and second electrical signals coincide (overlap) one another, and can range from a small percentage of the feature size associated with the spot size of the first and second beam, up to the same size as the beam. Therefore, the effective beam size associated with the third electrical signal ranges between zero, when first and said second signals do not temporally coincide, and up to the diameter of the smaller of the first and said second spots when those signals fully coincide temporally. The signal to noise ratio of the resultant third electrical signal is improved since spuriant noise peaks are suppressed by the averaging effect that occurs as a result of combining the temporally displaced electrical signals.

Furthermore, it will be appreciated that changing the delay between the first and second electrical signals alters the coincidence of the signals resulting from the two beams and the feature width within the resultant third waveform, which effectively alters the beam spot size. The invention therefore allows the detection of two displaced beams to generate waveform features equivalent to those of a single beam of shorter wavelength. The invention also provides the ability to modulate the effective beam spot size for use with different density media, without the need of mechanical intervention.

An object of the invention is to provide an optical pickup in which the effective beam spot size may be modulated electronically.

Another object of the invention is to increase the signal to noise ratio of data read from an optical media.

Another object of the invention is to provide an optical pickup that is capable of properly reading data from optical media of different bit densities.

Another object of the invention is to provide for the low cost introduction of optical storage devices having increased bit densities.

Further objects and advantages of the invention will be brought out in the following portions of the specification, wherein the detailed description is for the purpose of fully disclosing preferred embodiments of the invention without placing limitations thereon.

BRIEF DESCRIPTION OF DRAWINGS

The invention will be more fully understood by reference to the following drawings which are for illustrative purposes only.

DETAILED DESCRIPTION

Referring more specifically to the drawings, for illustrative purposes the present invention is embodied in the apparatus generally shown in FIG. 1 through FIG. 7. It will be appreciated that the apparatus may vary as to configuration and as to details of the parts, and that the method may vary as to the specific steps and sequence, without departing from the basic concepts as disclosed herein.

Figure 1:
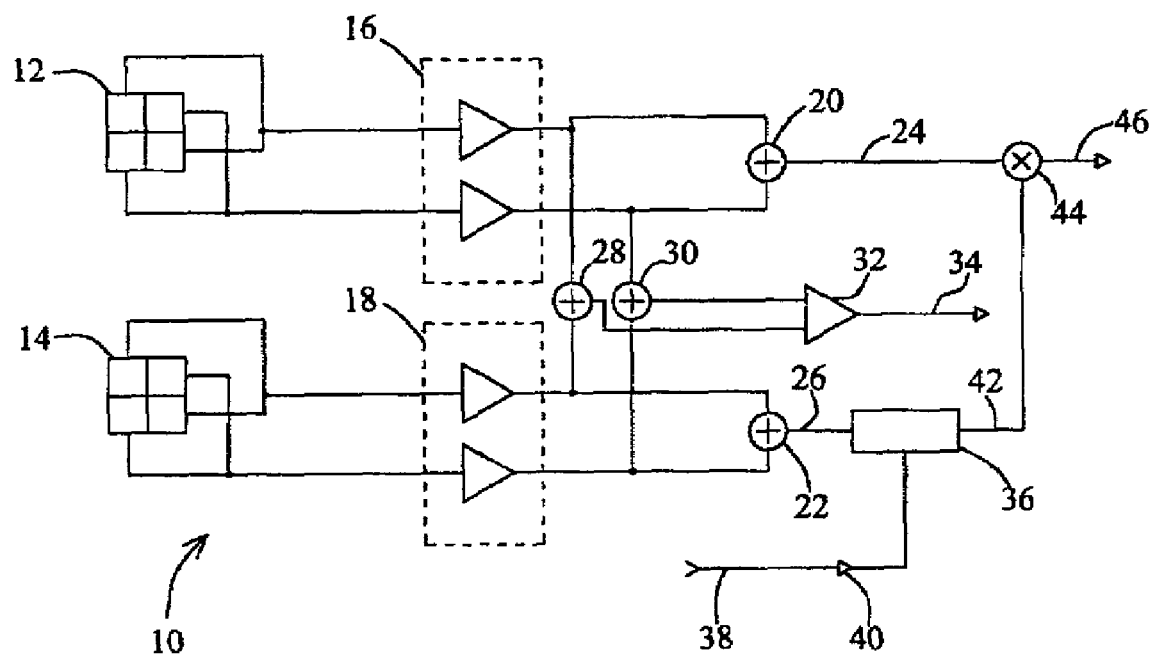
FIG. 1 is a block diagram of the high density optical pickup according to an embodiment of the present invention, showing the combination of leading and lagging reflected beam detection.

FIG. 1 depicts an optical pickup circuit 10, which detects light from two beams reflected from a track within an optical media being read. The first and second light beams are directed along the same track on the media and comprise a leading beam, which impinges on optical data bits of the given track a small amount of time prior to the lagging beam. Preferably, the first and second beams are separated from one another by a minimal distance without over lapping one another. Optical pickup circuit 10 provides for the adjustment of the effective beam spot size to suit the density of the optical media whose data is being read. Two sets of photodetectors (12 and 14) are positioned to receive the reflected light beams. First and second photodetectors, 12 and 14, are preferably arranged in arrays comprising photodiodes that are sensitive to the frequency of the reflected light beams.

Photodetector 12 is positioned to detect the lagging beam and to generate lagging electrical signals which are conditioned by conditioning circuitry 16, such as comprising an amplification stage and filtering (not shown). Similarly, photodetector 14 is configured to detect the leading beam and to generate leading electrical signals, conditioned by conditioning stage 18. The electrical signals produced from the photodetectors 12 and 14 are summed at summing circuits 20 and 22 respectively, to produce a lagging electrical signal 24 and a leading electrical signal 26. It will be appreciated that the photodetector elements of the array are arranged so that focusing errors may be detected by using summing circuits 28 and 30, which drive an amplifier 32 which generates a focus error signal 34.

It will be appreciated that an even light distribution on the photodetectors arranged perpendicular to the direction of the track results in a nulling of the focus error signal. Furthermore, positive and negative swings of the focus error signal can indicate that the optical pickup may need to be repositioned to assure correct reading of the data. A delay circuit 36 is coupled into the leading electrical signal 26 to temporally shift the signal. Delay circuit 36 is preferably configured to delay the leading signal by a selected amount 38 received by a delay circuit input 40. Delay 36 provides that bits represented in the delayed version of leading electrical signal 42 will at least partially overlap bits represented in the lagging electrical signal 24.

The overlap of bit features within the leading and lagging electrical signals is referred to as coincidence of the waveforms which can be measured from zero coincidence, no overlap, to full coincidence wherein the signals overlap one another fully. It will be appreciated that the amount of delay required to provide a given amount of coincidence depends on the distance between the leading and lagging photodetectors along the track, and the speed with which the track is rotating. The track speed is determined by the rotational speed of the media in radians per second multiplied by the radius of the track being read by said photodetector. It will be appreciated, therefore, that the delay value is preferably adjusted in response to the effective beam spot size which is desired and the track being read for a given disk speed.

Lagging electrical signal 24 and the delayed leading electrical signal 42 are combined such as at multiplier circuit 44, which results in the creation of a resultant third electrical signal 46 to represent the reflected beam. With delay 36 adjusted for partial coincidence of the first and second reflected beams, the width of a detected bit within the third electrical signal is less than the width represented within either the first or second electrical signals. The narrow feature width associated with a detected data bit on the media provides an effective reduction in bit size such that a beam having a spot size greater than the size of the data bit may be utilized. Furthermore, the effective beam size is adjustable for use with media having differing bit densities without the need of different wavelength light sources and/or optomechanical adjusting.

Figure 2:
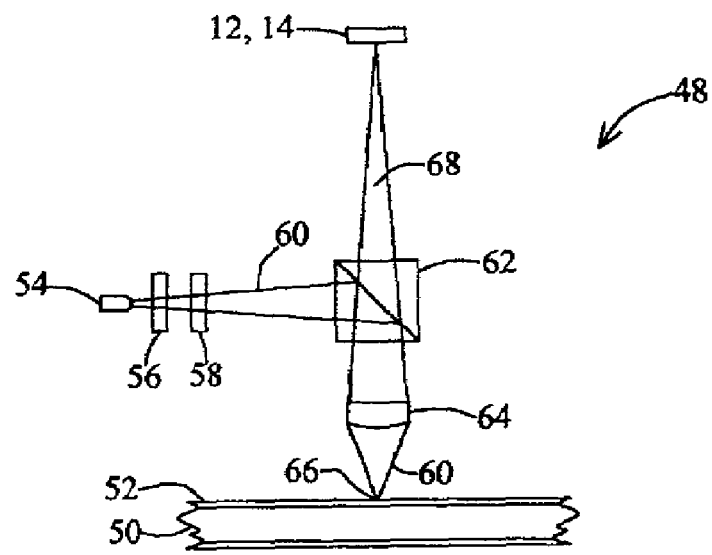
FIG. 2 is a block diagram of the light path according to an aspect of the present invention showing the splitting and direction of a laser light source onto the surface of the media and the detection of the reflected light therefrom.

FIG. 2 exemplifies a light path 48 which provides for the reading of data from a media 50, such as an optical disk, having a surface 52 encoded with optical data bits. The two beams used according to the present invention are derived from a single laser 54 which is split into three beams by a diffraction grating 56. The two outer beams are directed to straddle the information track for detecting the tracking error signal. The three beams are split again by a BLAZE grating 58 into two sets of three beams shown as beam 60, wherein two central read beams can be directed tangentially along the optical track of the media for reading the bits encoded on the surface. The two central beams are preferably spaced close to one another without overlapping, wherein the amount of time delay required is minimized. It will be appreciated that the creation of two proximal read beams may be performed in a number of alternative ways without departing from the present invention, such as the use of multiple laser sources and other forms of optically splitting a beam. Beam 60 is directed at beam splitter 62 which redirects the pattern of reading and tracking beams toward articulate objective (lens) 64, which focuses beam 60 onto a location 66 on surface 52 of optical media 50. The beam of light is reflected from optical media 50 and passes back through splitter 62 as reflected beam 68 toward optical detectors 12 and 14.

Figure 3:
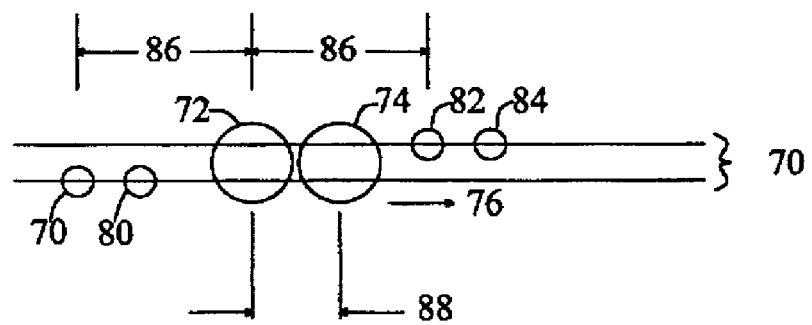
FIG. 3 is a top view of a beam arrangement according to the aspect of the invention shown in FIG. 2.

FIG. 3 depicts a beam spot pattern created by the optical arrangement shown in FIG. 2. The boundaries of a track 70 are shown over which two read beam spots are directed 72 and 74. The motion of beam spots 72 and 74 in relation to track 70 are shown by direction arrow 76. It will be appreciated, therefore, that beam spot 74 provides a leading beam spot 74 while beam spot 72 is the lagging beam spot. Maintaining a fixed relationship with the reading beams 72 and 74, are tracking beams 78, 80, 82, and 84 that sense the edges of the track to facilitate tracking control. An angular displacement of beam spots created by diffraction grating 56 arrives at media 50 as a linear displacement 86. An angular displacement created by BLAZE grating 58 arrives at media SO with a linear displacement 88 that is preferably slightly larger than the beam spot diameter at the location.

Figure 4:
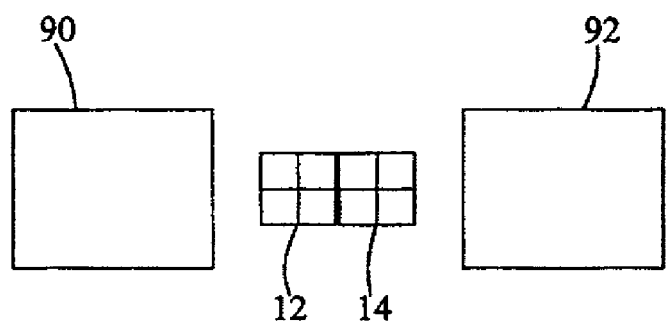
FIG. 4 is a top view of a photodiode array used according to an aspect of the present invention.

FIG. 4 exemplifies an arrangement of photodetectors positioned to detect the reflected light beams from the surface of the media. One photodetector array 12 is positioned to detect the light reflected from lagging beam spot 72, while another photodetector array 14 is positioned to detect the light reflected from leading beam spot 74. Additional photodetectors 90 and 92 provide for sensing how the beams are tracking the data track within the media 50.

Figure 5:
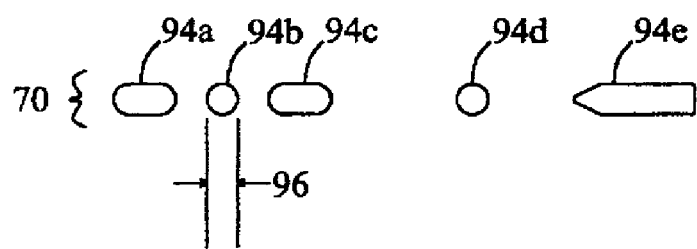
FIG. 5 is a top view of representative optical features along a data track of an optical media.

FIG. 5 depicts optical features 94a through 94e, which are distributed along a data track 70 of the optical media as data which is to be optically read. Within this arrangement data bits may be elongated, as with 94a, 94c, and 94e, or they may be constricted as in 94b, 94d, which are bounded by unpitted areas representing bits of the opposing polarity. The beam spot diameter 72, 74 utilized for reading the data from the optical media is traditionally selected to coincide with the diameter of the features to be detected. However, it will be appreciated that the beam diameter utilized within the present invention may be significantly larger as a result of the method used for electrically overlapping the beams spots to reduce the effective spot size.

A dual beam reader according to the invention may be adapted to utilize two beam spots of a larger diameter than the feature size associated with the given data density of the media. The present invention, for example, allows for the reading of CDs and DVDs utilizing the same laser source, although the feature sizes and resultant densities differ substantially. It will be appreciated that the feature size within a CD is approximately 1000 nanometers (nm) and is traditionally read using a single laser light source to generate a beam. Digital video disks (DVDs) have higher storage capacities than are available with CDs and contain data bits with a smaller feature size. By way of example, the present invention is capable of reading both CDs and DVDs without utilizing light sources of differing wavelength.

Reading of a CD utilizing the present invention may be performed by reading its features with a pair of beams having a wavelength of approximately the same size as its features, and a delay adjusted to provide substantially complete coincidence. The delay may then be adjusted to reduce the amount of coincidence between the beams to sixty eight percent, (68%), wherein the effective beam spot size is reduced by sixty eight percent, (68%). It will be appreciated that the cost of the optics for the combined player may be reduced by utilizing a single larger wavelength laser for reading data from media upon which data of different densities has been encoded. It should further be appreciated that the use of dual beam reading according to the invention generates an effective beam having a lower noise factor, and thereby an increased signal to noise ratio. Noise is reduced because each of the two detectors is independently subject to incoherent optical and electrical noise, which is attenuated when the signals are combined.

Switching between CD and DVD formats may then be performed within the present invention by altering the delay being introduced into the leading electrical signal to alter the amount of coincidence achieved between the leading and lagging electrical signals. It should also be appreciated that the technique may be utilized within any optical data storage system that would benefit from the ability to adjust the effective beam size independently of the wavelength of the generated light beam used for reading.

Figure 6:
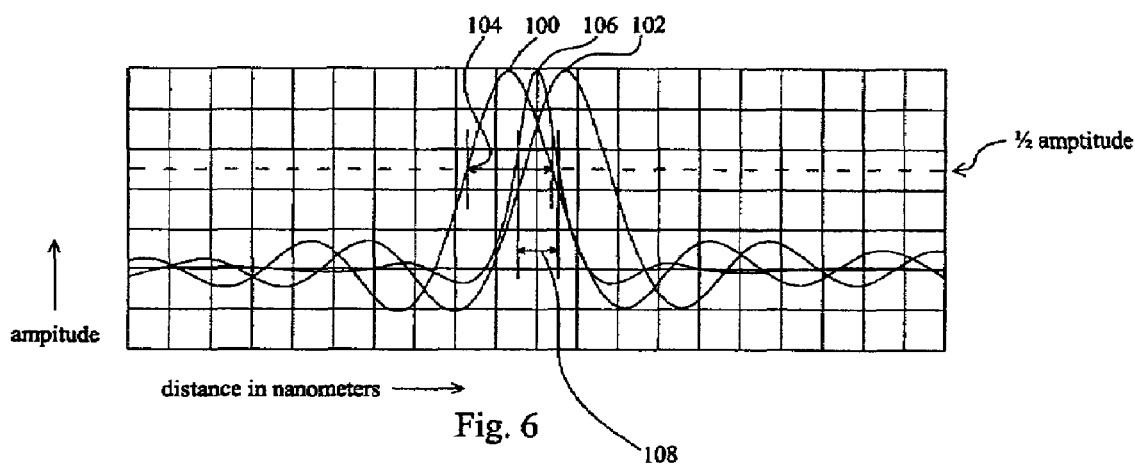
FIG. 6 is a graph of the leading and lagging electrical signals associated with the reflections of the impinging beam spots according to the present invention, shown being combined to generate a third electrical signal.

FIG. 6 depicts combining waveform components associated with the leading and lagging light beams. The waveform peaks are generated in response to the detection of data pits on the surface of the media. The waveform peak for the same data bit is read with two different detectors, and the electrical signal 102 associated with the leading detector is delayed by an amount so that it partially overlaps the signal 100 from the lagging detector. At half of the maximum amplitude the waveform "pulse" width 104 is approximately 780 nanometers. Combining the leading 102 and lagging 100 waveforms with a multiplier results in a waveform 106 having a narrower feature peak, whose measured width 108 is approximately 530 nanometers. The delay has been set so that the leading and lagging waveforms overlap by approximately sixty eight percent (68%) wherein the electrical signal which results from multiplying the two waveforms would be expected, for example, to have a width of 780 nanometers×0.68=530 nanometers.

Figure 7:
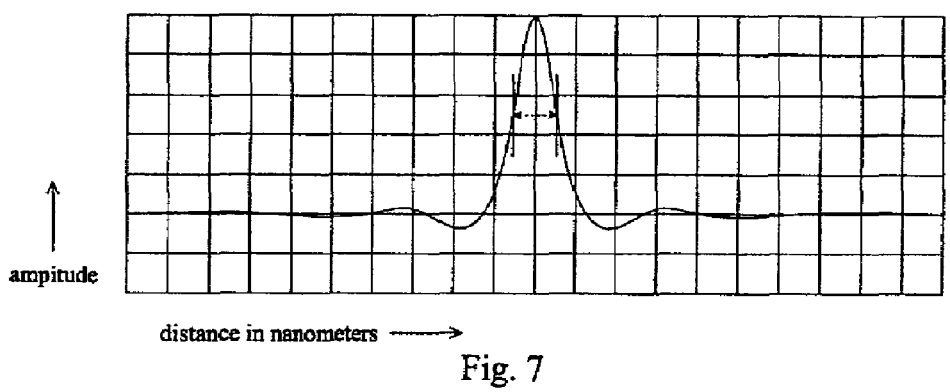
FIG. 7 is a graph of the waveform within the third electrical signal responsive to the combination of electrical signals as shown in FIG. 6.

FIG. 7 is a graph simulating the resultant waveform in which the actual beam spot size of 780 nm has been used to provide an effective beam spot size of 530 nm. The effective overlap between the two beams must be less than the smallest data element on track 70. In addition, the effective overlap between leading 102 and lagging 100 waveforms must preferably be as great as possible to increase resolution and minimize noise.

Accordingly, it will be seen that this invention provides a method and apparatus for electronically modulating the effective spot size of a light beam used for reading a media having optically encoded data bits. Embodiments for the circuit and optical arrangement were shown by way of illustration, however, it will be appreciated that anyone of ordinary skill in the art can modify the implementations shown without departing from the present invention. Specifically, various forms of optical detectors may be utilized for detecting the light which reflects from the surface of the media. The signal from the optical detectors may be conditioned prior to being delayed and combined wherein the amplitude and bandwidth of the signal is adjustable. Combining the leading and lagging waveforms was performed using a multiplier circuit, however, other forms of combinations may be utilized such as a thresholded sum, which can accentuate the waveform portions that coincide. An optical path was illustrated in which a single laser was split by a diffraction grating and a BLAZE grating and reflected toward the media with a beam splitter. It will be appreciated that the formation of two proximal beams of light and directing them to the surface of the media can be implemented using a number of optical mechanisms without departing from the teachings of the present invention. It should further be recognized that the light signals detected by the optical detectors may be converted to digital signals prior to the addition of the delay and combining, such as with a coincidence gate, to create a resultant electrical signal.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the abovepreferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

The invention claimed is:

1. An optical pickup capable of reading data along at least one of a plurality of tracks located on a rotating information plane of an optical medium which provides an electrical modulation of an effective spot size of a read beam, comprising:
   means for sensing optical information on a track, said optical information sensing means capable of generating a first electrical signal and a temporally lagging second electrical signal in response to a single data element encoded on said track;
   a delay circuit which introduces a temporal delay into said first electrical signal so that it at least partially coincides with said second electrical signal; and
   a circuit which receives and combines said first and said second electrical signals to output a third electrical signal related to the coincidence between the delayed first electrical signal and said second electrical signal;
   whereby the effective spot size of the read beam is varied in response to an amount of coincidence created as a result of the delay introduced into said first electrical signal.

2. An optical pickup as recited in claim 1, wherein said means for sensing optical information comprises
   at least one laser light source adapted to direct two beams of light toward adjacent locations along said track of said medium; and
   two optical detectors positioned to receive and register reflected light of said beams from said medium and to generate electrical signals in response thereto.

3. An optical pickup as recited in claim 2, wherein said laser light source comprises:
   a laser light source capable of outputting a single laser light beam;
   a diffraction grating positioned to receive and split said laser light beam into a central read beam and a peripheral tracking beam;
   an optical mechanism positioned to receive said central read beam, wherein said read beam is split into two separate read beams for direction along said track; and
   an objective positioned to receive said separate read beams and to focus said beams onto nearby locations within said track.

4. The optical pickup as recited in claim 3, wherein said optical mechanism comprises a BLAZE grating.

5. An optical pickup as recited in claim 3, further comprising:
   a beam splitter positioned between said optical mechanism and said objective;
   wherein said beam splitter directs a portion of the optical energy from all of said beams toward said objective; and
   wherein said beam splitter is positioned to receive the reflection of said beams, a portion of the optical energy of which is directed for registration.

6. An optical pickup as recited in claim 5, wherein said optical detectors comprise photo-sensitive arrays.

7. An optical pickup as recited in claim 6, wherein said photo-sensitive arrays comprise photodiodes.

8. An optical pickup as recited in claim 1, wherein said temporal delay of said delay circuit is selected based on the relative velocity of said medium in relation to said optical information sensing means and a distance between said first spot and said second spot with respect to said track of said optical medium.

9. An optical pickup as recited in claim 1, wherein an amount of temporal delay introduced by said delay circuit within said first electrical signal is variable.

10. An optical pickup as recited in claim 9, wherein said amount of temporal delay of said delay circuit is responsive to the receipt of a delay selection input.

11. An optical pickup as recited in claim 10, wherein an effective diameter associated with said third electrical signal output by said circuit is selected by varying an amount of said delay; and
    wherein said effective diameter associated with said third electrical signal ranges between zero, when said first and said second signal do not temporally coincide, up to the diameter of the smaller of said first and said second spots when said first and said second signals fully temporally coincide.

* * * * *